Sept. 15, 1953      H. STIERLIN      2,651,923
EVAPORATOR FOR REFRIGERATING APPARATUS
Filed Dec. 28, 1949
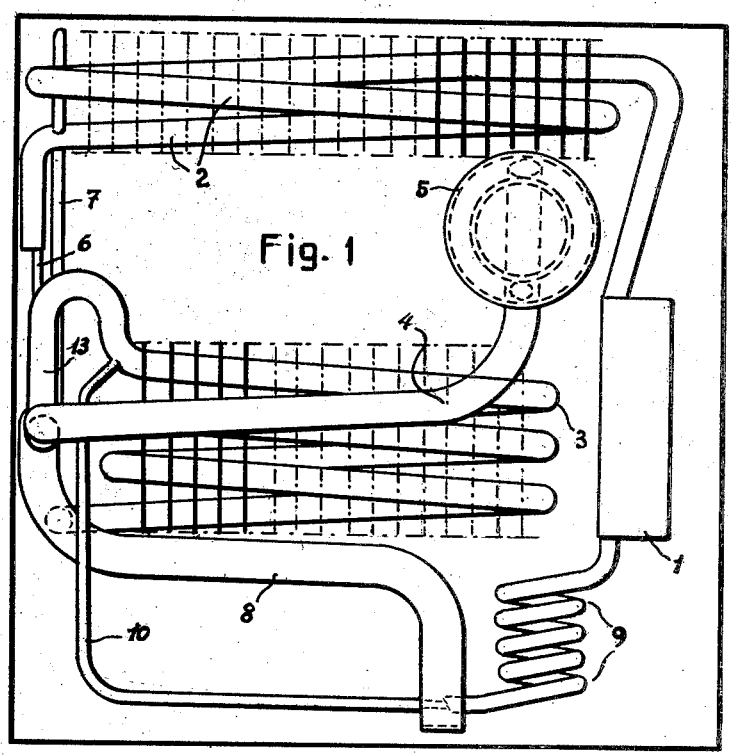
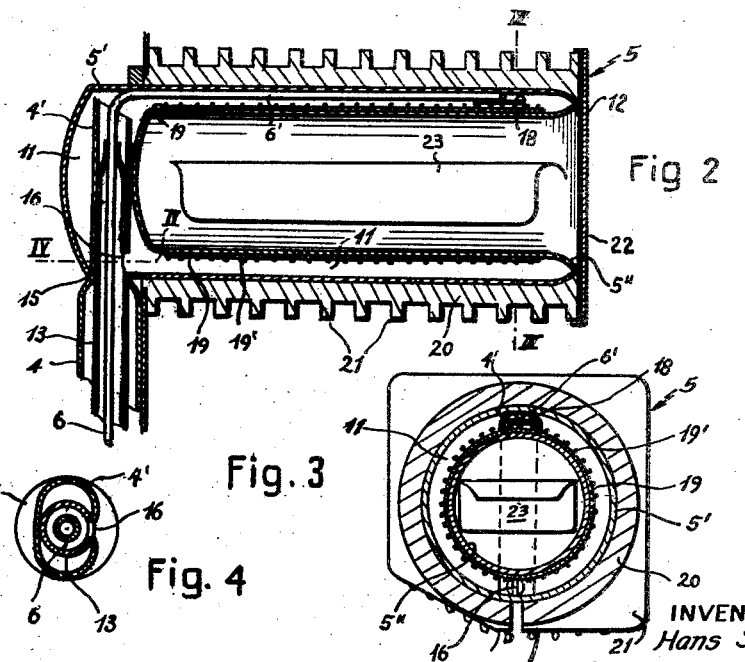
INVENTOR
Hans Stierlin
BY
ATTORNEYS Patented Sept. 15, 1953

2,651,923

UNITED STATES PATENT OFFICE 2,651,923

EVAPORATOR FOR REFRIGERATING APPARATUS

Hans Stierlin, Zurich, Switzerland

Application December 28, 1949, Serial No. 135,501
In Switzerland September 2, 1949

6 Claims. (Cl. 62—126)

The present invention relates to a refrigerating apparatus of the absorption type operating with a pressure-balancing inert auxiliary gas.

In known apparatus of the said type the evaporator consists either of an upright vessel presenting distributing plates for the liquid refrigerant or of a pipe coil in which are arranged means for retarding the flow of refrigerant that trickles through the evaporator tube, for the purpose of forming the maximum evaporating surfaces.

Evaporators of pot form comprise components which must be connected in good thermal contact with the wall of the evaporator, which involves a complicated and therefore relatively expensive construction. Evaporators of this class suffer in addition, from a thermodynamic point of view, from the drawback that the paths from the points of evaporation, i. e., the points of production of cold, to the points of the evaporator wall for reception of heat, are relatively long.

The use of so-called pipe coil evaporators which, as is known, are responsive to liquid level, requires relatively expensive starting materials. Added to this drawback, the correct formation of the pipe coils for the purpose of obtaining good thermal connection of the evaporator pipe with its wall covering for the reception of heat from the space to be cooled, for example, with a body having fins, is relatively expensive. A further thermodynamic drawback of pipe coil evaporators is occasioned by the circumstance that the coils have relatively large losses of pressure in the auxiliary gas circuits on account of the pipe lengths and cross sections. In consequence, the useful pressure drop in the gas heat exchanger is reduced, which reduction for a given surface of heat exchanger impairs the efficiency of the apparatus.

In the present absorption cooling apparatus according to the invention these drawbacks are obviated in that there is provided a double-walled horizontally arranged evaporator the wall of which presents at least in part a coating serving for distribution of the liquid refrigerant.

In the accompanying drawing there is illustrated by way of example an embodiment of the invention.

Fig. 1 shows the absorption cooling apparatus in elevation.

Fig. 2 shows the evaporator with its pipes for refrigerant means and pipes for introduction and outflow of gas.

Fig. 3 shows the evaporator in cross section on the line III—III of Fig. 2.

Fig. 4 is a section to a larger scale on the line IV—IV of Fig. 2 through the pipes of the evaporator serving for passage of the refrigerant, and for inflow and outflow of gas.

The absorption cooling apparatus illustrated as a unit in Fig. 1 comprises a boiler 1 formed in manner known per se, a condenser 2, an absorber 3, and a gas heat exchanger 4, as well as the evaporator 5 of the invention. A pipe 6 of small bore led in part through the heat exchanger pipe 4 conducts the refrigerant liquefied in the condenser to the evaporator 5, and a pipe 7 also of small bore serves as a pressure-balancing means for the auxiliary gas. Pipes 8 and 9 serve for return to the boiler 1 of the solution, which solution has been enriched with refrigerant in the absorber 3. A pipe 10 of small bore passing in part through the pipe coil 9 leads solution poor in refrigerant to the absorber.

The evaporator chamber 11 (Fig. 2) is formed by a cup-shaped hollow outer body 5' and a hollow inner body 5'' of similar form surrounded by and spaced from the body 5', the lateral walls of these two cylindrical co-axially arranged hollow bodies converging towards one another at the mouth end of the chamber and being interconnected by a welded seam or seams 12 (Fig. 2).

Between the dished end walls of the hollow bodies 5', 5'' there is accommodated part of the refrigerant supply pipe 6, the end 4' of the gas heat exchanger pipe 4 through which the hydrogen used as an inert gas flows into the evaporator chamber, and part of the pipe 13 returning the mixture of refrigerant vapour and gas to the absorber 3. These pipes 6, 4' and 13 for conduction of refrigerant, inflow of gas and outflow, are arranged co-axially and are introduced together through a rear wall portion on the underside of the outer hollow body 5', so that only a single welding seam or fusion seam is necessary at the common introduction point 15 of these pipes. The tubular piece 4' forming the hydrogen conduit is thus, from the point 15 of introduction up to the upper end of elliptical cross section, held flat against the inner pipe 13 forming the return conduit for the gas-vapour mixture, so that the pipe 13 is held in the pipe 4'. The end of the pipe 13 tapers down to the cross section of the refrigerant supply pipe 6, so that the pipes 6 and 13 are held in co-axial relation. Above the common point of introduction to chamber 11 the two pipes 4' and 13 are provided with a common opening 16 directed towards the annular space of the evaporator, through which opening the mixture of refrigerant vapour and gas flows from the evaporating chamber. This co-axial arrangement of the inlet and outlet pipes and their introduction at a single point at the rear of the evaporator render possible, as appears from Fig. 2, an advantageous structural arrangement behind the rear wall 17 of the refrigerator cabinet, which rear wall 17 extends from the base of the hollow body forming the external surface of the evaporator.

To ensure an advantageous path of flow the hydrogen supply pipe 4' is led to the upper portion of the evaporator chamber and the refrigerant supply pipe 6' within this portion is led forwardly. To the inner side of the mouth of this pipe 6' is arranged a small plate 18 for distributing the outflowing liquid refrigerant and for preventing the return flow of the same along the pipe 6'. The inner hollow body 5" is provided on its surface which forms the inner wall of the evaporating chamber with a covering 19 which promotes the distribution of the liquid refrigerant supplied thereto and which advantageously consists of asbestos foil which exercises capillary attraction and thereby provides an evaporating surface of high efficiency. This covering is secured by means of a wire net 19' against the outer surface of the wall 5". In lieu of asbestos foil the covering may consist, for example, of textile fibres or other material exercising capillary attraction, for example, a layer of ceramic metallic oxide.

The evaporating chamber may advantageously be subdivided, in that, for example, parts of the wall of the outer hollow body may be pressed against the inner body and the bodies welded together to form therewith hermetically separated chambers, separate refrigerant inflow and outflow conduits being led to each such evaporating chamber.

The hollow body 5' forming the outer wall of the evaporator disposed in the refrigerating space of the respective cabinet is surrounded by a body 20 provided in manner known per se with fins 21 for conducting heat to the evaporator wall, said body consisting, for example, of cast aluminium. In lieu of a unitary finned body there may be arranged several thermally insulated bodies of different superficial areas.

Preferably, the lower edges of the fins 21 are formed at one side to slope towards the vertical axial plane of the evaporator so that, on defrosting the evaporator the drops of moisture are led from one side towards the middle to a drip plate set below the finned body.

The mouth end of the cooling chamber is provided with an access door 22. 23 denotes an ice-forming tray inserted into the deep cooling chamber afforded by the evaporator. This deep cooling chamber facilitates handling of the ice tray, which latter contacts with the interior wall of the chamber only along two edges, so that there is practically no risk of the dish becoming frozen on to the wall of the chamber.

The structurally simple construction of the evaporator of the described absorption refrigerating apparatus realises important technical advantages from a manufacturer's standpoint, there being provided an evaporator of optimum thermodynamic efficiency. As a result of the double-walled formation of the evaporator the heat transmission surface is very large relatively to the capacity of the evaporating chamber, with relatively short diffusion paths for evaporating refrigerant, which is of the highest importance for efficiency, especially on account of the marked diminution of the pressure drop therein.

By the provision in the interior of the evaporator of a covering in the form of a capillary-active layer for distributing the liquid refrigerant, there is provided the equivalent of a relatively large evaporating surface. Further, by a suitable distributing arrangement of the capillary layer in the evaporator there may be formed selectively differing evaporating or cooling zones. The cylindrical formation of the evaporator permits the simple fitting of the finned body for the reception of heat and provides large heat conducting contact surfaces between it and the evaporator wall. Further, this construction renders possible also advantageous utilisation of the space in the respective cabinet.

What is claimed is:

1. In a refrigerating apparatus of the absorption type, a horizontally arranged evaporator comprising a pair of hollow cup-shaped bodies arranged co-axially one within the other in spaced relation to each other, the rims of said bodies being jointed together with a gas-tight joint thereby forming an evaporating chamber between the bodies, the inner cup-shaped body defining a cooling chamber, a gas-inflow pipe extending through the lower end portion of the side wall of the outer body opposite its rim in gas-tight relation to said side wall, said gas-inflow pipe extending into the space between the end walls of said bodies and having a discharge opening, means for conducting a refrigerant onto the outer surface of the inner body, and means for conducting gas and vapor from the evaporating chamber.

2. A refrigerating apparatus as claimed in claim 1, in which the means for conducting gas and vapor from the evaporating chamber comprises a pipe inside said gas-inflow pipe having a connection opening into the lower portion of the evaporating chamber.

3. A refrigerating apparatus as claimed in claim 1, in which the means for conducting a refrigerant comprises a pipe extending through said gas-inflow pipe and along the upper portion of the inner body to a point near its rim, said pipe terminating at said point and having an outlet for the delivery of refrigerant into the evaporating chamber.

4. In a refrigerating apparatus of the absorption type, a horizontally-arranged evaporator comprising a pair of hollow cup-shaped bodies each consisting of one piece and arranged one within the other, the rims of said hollow bodies converging toward each other and being welded together the outer surfaces of the inner body being spaced from the corresponding inner surfaces of the outer body thereby forming an evaporating chamber between the cup-shaped hollow bodies, a gas-inflow pipe extending through the lower end-portion of the side wall of the outer body in gas-tight relation to said side wall, said gas-inflow pipe extending into the space between the end walls of said bodies and having a discharge opening, a pipe for conducting gas and vapor from the evaporating chamber arranged inside said gas-inflow pipe and having a connection opening into the lower portion of the evaporating chamber, and a pipe for conducting a refrigerant into the evaporating chamber extending axially through said gas-inflow pipe and opening into the evaporating chamber.

5. A refrigerating apparatus as claimed in claim 4, including a covering on the outer surface of the inner body adapted to exercise capillary attraction for the refrigerant.

6. In a refrigerating apparatus of the absorption type, a horizontally-arranged evaporator comprising a pair of similarly-shaped hollow cup-shaped bodies arranged one within the other in spaced relation to each other, the rims of said bodies being adjacent to each other and joined together with a gas-tight joint thereby forming an evaporating chamber between the cup-shaped bodies, the inner cup-shaped body defining a cooling chamber, a gas-inflow pipe extending through the end portion of the outer body opposite its rim in gas-tight relation to the wall of said body, said gas-inflow pipe extending into the space between the end walls of said bodies and having a discharge opening, means for conducting a refrigerant onto the outer surface of the inner body, a covering on the outer surface of the inner body adapted to exercise capillary attraction for the refrigerant, and means for conducting gas and vapor from the evaporating chamber formed between said hollow cup-shaped bodies.

HANS STIERLIN.

References Cited in the file of this patent

UNITED STATES PATENTS

| Number | Name | Date |
|---|---|---|
| 1,960,040 | Widell | May 22, 1934 |
| 2,095,008 | Philipp | Oct. 5, 1937 |
| 2,134,149 | Schellens | Oct. 25, 1938 |
| 2,243,307 | Campbell | May 27, 1941 |
| 2,304,413 | Kleucker | Dec. 8, 1942 |
| 2,307,947 | Payne | Jan. 12, 1943 |
| 2,407,733 | Ashby | Sept. 17, 1946 |

FOREIGN PATENTS

| Number | Country | Date |
|---|---|---|
| 520,953 | Great Britain | May 8, 1940 |